T. WITHROW.
HOSE COUPLING.
APPLICATION FILED APR. 23, 1907.

904,036.

Patented Nov. 17, 1908.

Witnesses
Georgiana Chace
George Holloway

Inventor
Thomas Withrow
By Luther V. Moulton
Attorney

UNITED STATES PATENT OFFICE.

THOMAS WITHROW, OF ALLEGAN, MICHIGAN.

HOSE-COUPLING.

No. 904,036.  Specification of Letters Patent.  Patented Nov. 17, 1908.

Application filed April 23, 1907. Serial No. 369,848.

*To all whom it may concern:*

Be it known that I, THOMAS WITHROW, a citizen of the United States of America, residing at Allegan, in the county of Allegan and State of Michigan, have invented certain new and useful Improvements in Hose-Couplings; and I do hereby declare the following to be a full, clear, and exact description of the invention, such as will enable others skilled in the art to which it appertains to make and use the same.

This invention relates to hose couplings, more particularly to the class of devices of this character wherein the coupling and uncoupling is "instantaneous," and has for its object to improve the construction and increase the efficiency and utility.

With these and other objects in view, the invention consists in certain novel features of construction, as hereafter shown and described, and specifically pointed out in the claims.

Figure 1:
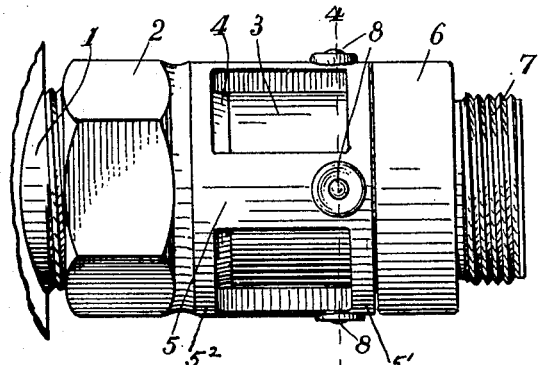
Figure 4:
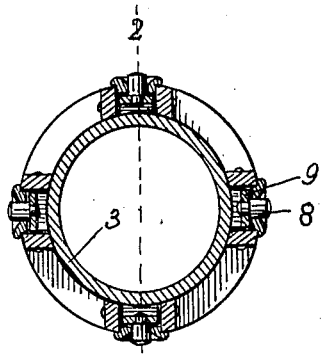
Figure 2:
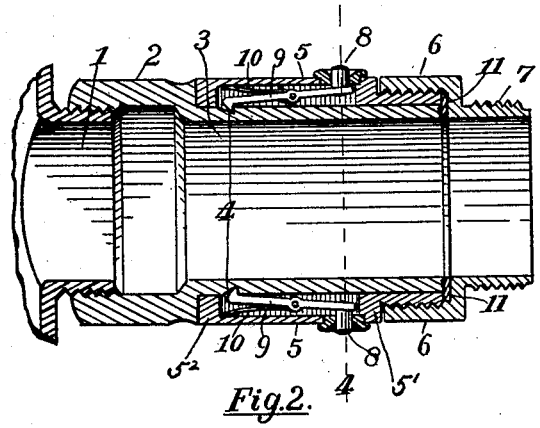
Figure 3:
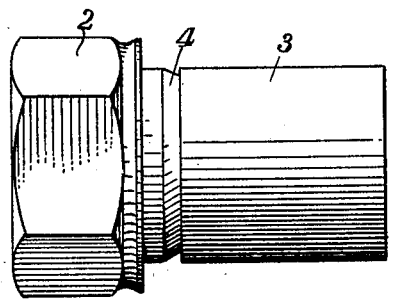

In the drawings employed for illustrating the embodiment of the invention, Figure 1 is a side elevation of the improved device. Fig. 2 is a longitudinal sectional elevation on the line 2—2 of Fig. 4. Fig. 3 is a side elevation of the main body portion of the device. Fig. 4 is a transverse section on the line 4—4 of Fig. 2.

For the purpose of illustration, the invention is shown applied to a spout portion of a hydrant represented at 1, and consists of a main body portion 2 internally threaded for engagement with the threaded portion of the hydrant coupling and with the outer face of the portion 2 formed with wrench receiving faces, as shown. The forward portion of the body 2 is extended in cylindrical form, as at 3, and smaller than the body portion, whereby an annular shoulder is formed between the portions 2—3. The portion 3 is also provided with an annular exterior channel 4 near the shoulder. Bearing over the outer end of the cylindrical portion 3 is a sleeve 5', and extending from this sleeve toward the larger body portion 2 are spaced ribs 5, and uniting these ribs is an integral annular band $5^2$, the portion $5^2$ bearing over the cylindrical portion 3 adjacent to the larger portion 2 and against the annular shoulder.

The parts 5'—5—$5^2$ are constructed in one piece, and the portions 5 are hollow at their under sides, or next to the cylindrical portion 3, as shown in Figs. 1, 2 and 4. The exterior of the sleeve 5' is threaded and adapted to receive the coupling member 6 which carries the hose, not shown, the member 6 having the threaded portion 7 to receive the hose and with a shoulder to support a packing element 11, bearing against the outer ends of the members 3—5', as shown in Fig. 2.

Pivoted within the hollows of the members 5 are catch levers 9 with their hooks at one end adapted to engage the channel 4, the levers 9 being held yieldably in contact with the channel by springs 10. The outer ends of the levers 9 are provided with push buttons 8 extending through suitable apertures in the members 5, as shown.

With the device thus constructed, it is obvious that the sleeve 5' with its connecting members 5 and annular portion $5^2$ may be passed over the cylindrical portion 3 of the body until the portion $5^2$ abuts against the shoulder of the portion 2 when the catch levers 9 will automatically engage the channel 4 and thus lock the parts together. When the coupling is to be released it is only necessary to depress the push buttons 8 and withdraw the sleeve and its attachments.

The improved device is simple in construction, can be inexpensively manufactured in any required size and of any suitable material, and may be applied whenever instantaneous hose couplings are required.

Having thus described the nature of the invention, what is claimed as new is:—

1. A device of the class described comprising an inner tubular member having a groove, an outer sleeve member bearing over the inner tubular member and adapted to be connected at its free end to a hose, an annular band spaced apart from the sleeve member, hollow longitudinal bars connecting the band and sleeve, said bars being spaced apart from each other, hooked locking members located in the hollow bars for engagement with the groove in the inner tubular portion, and means for manually operating the locking members.

2. A device of the class described comprising an inner tubular member, a sleeve bearing over the inner tubular member and adapted to be connected at its free end to a hose, an annular band spaced apart from the sleeve member, hollow longitudinal bars connecting the band and sleeve, said bars being spaced from each other, and locking means located in the hollow bars for engagement with the inner tubular member to lock the tubular member and band together.

In testimony whereof I affix my signature in presence of two witnesses.

THOMAS WITHROW.

Witnesses:
 FRED I. CHICHESTER,
 W. L. DAVIS.